Sept. 22, 1931.  A. N. SCOTT  1,824,633

VEHICLE CHAIN

Filed Sept. 20, 1929

INVENTOR
ALLEN. N. SCOTT
BY Fetherstonhaugh & Co
ATTORNEYS

Patented Sept. 22, 1931

1,824,633

UNITED STATES PATENT OFFICE

ALLEN N. SCOTT, OF MONTREAL WEST, QUEBEC, CANADA

VEHICLE CHAIN

Application filed September 20, 1929. Serial No. 393,993.

This invention relates to new and useful improvements in anti-skid devices for vehicles and particularly to the chain type used on the wheels of automobiles, and the like.

The object of the invention is to provide a simple and easily attached device in which the cross chains, or the chains which come in contact with the road, will wear evenly and longer than the types of cross chains now generally in use.

Another object is to provide cross chains which when they wear out, or break loose, through any unforseen cause, will become detached without the use of tools and the like.

A further object is to secure the cross chains to the side chains through the agency of connecting links capable of having an independent creeping or turning motion so as to cause the wear on said connecting links to be more evenly distributed.

According to my invention, I provide endless holding chains positioned on each side of the wheel and extending between said holding chains and across the tread of the wheel are a plurality of endless cross chains. These cross chains are attached to the holding chains in such a manner that they can circulate or creep through the attachments during the travelling of the wheel, so that the links forming the cross chains wear in an even manner throughout their length. The cross chains are placed across the face of the wheel in the form of triangles, with at least one side angularly disposed to the axis of the wheel, so that when brought in contact with the road and acting as a tread, the forces acting thereon will tend to move the cross chains through their respective attaching means. The attachments between the cross chains and holding chains will include connecting links of circular form through which the cross chains are loosely threaded. These connecting links may be passed directly through selected links of the holding chains or may be rotatably secured to the latter through the agency of suitable clips, the essential requirement being that the connecting links shall be capable of an independent turning or creeping motion with respect to both the holding and the cross chains so that the wear on the connecting links will be more evenly distributed.

In the drawings which illustrate my invention,

Figure 1:
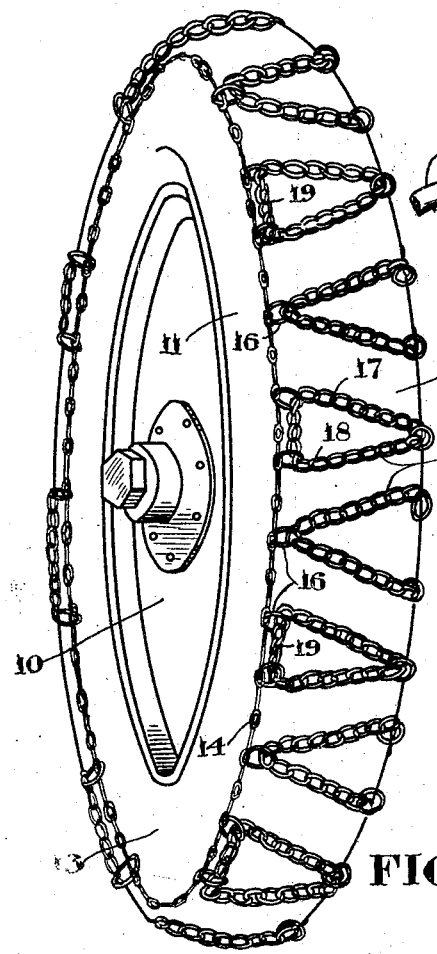
Figure 1 is a perspective view of an automobile wheel with my preferred form of anti-skid device attached thereto.
Figure 4:
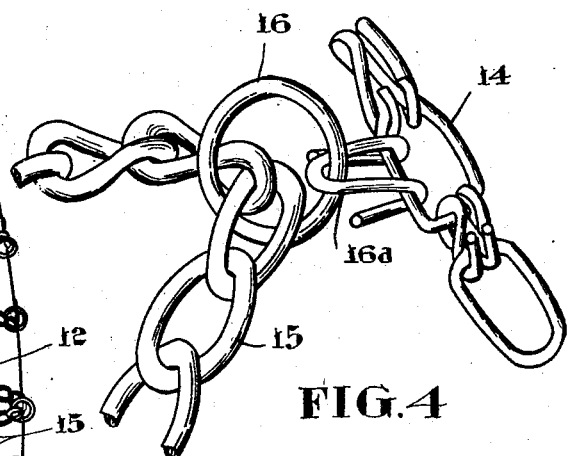
Figure 4 is an enlarged detailed view of a slight modification.
Figure 3:
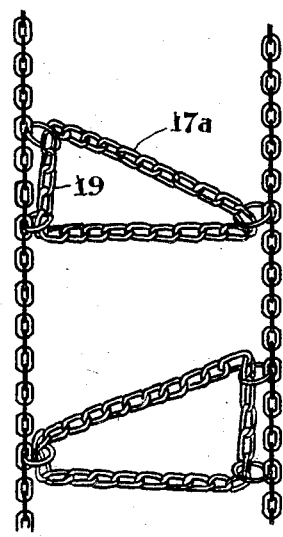
Figure 3 is an enlarged front elevation of anti-skid chains of somewhat similar construction to those shown in Figure 1.
Figure 2:
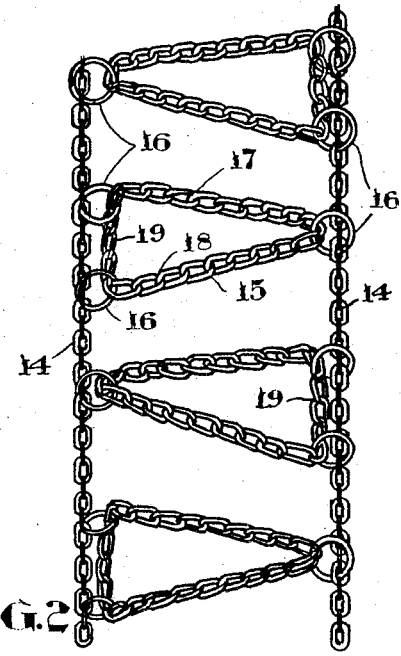
Figure 2 is an enlarged part front view of the device shown in Figure 1.

Referring more particularly to the drawings, 10 designates an automobile wheel equipped with a conventional tire 11 presenting the usual tread 12 and side walls 13. Extending circumferentially of the tire and engaging the side walls 13 are a pair of endless side chains 14. These side chains are connected together by means of endless cross chains 15 passing across the tire tread 12. The cross chains are of the endless type and are spaced from one another, as shown to advantage in Figure 1. The cross chains are threaded loosely through relatively large circular links 16 which may be passed directly through selected links of the side chains 14, as shown in Figures 1 to 3 inclusive, or may be rotatably secured to the side chains through the agency of suitable clips 16a, as shown to advantage in Figure 4. The connecting links are made large enough to allow the cross chains to circulate or creep therethrough during travelling movement of the wheel to which the chains are attached. The cross chains are arranged in triangular form across the tread of the tire with both sides 17 and 18 angularly disposed to the axis of the wheel, as shown in Figures 1 and 2, or with only one side 17a at an angle to the wheel axis, as shown in Figure 3. The cross chains are preferably positioned so that the parts 19 parallel to the side chains pass through two connecting links 16 secured to the side chain 14 at one side of the wheel, while the same parts of the adjacent cross chains pass through two links 16 secured to the side chain at the opposite side of the wheel. The apex of each triangular cross chain is held to the proper side chain by a single link 16.

In operation the part of the cross chains which comes in contact with the road prevents skidding of the wheel and increases the traction thereof on smooth or slippery surfaces. By placing one or both sides of the cross chains at an angle to the direction of wheel travel, the cross chains are caused to creep or circulate through the connecting links 16, so that all of the links of the cross chains are at one time or another brought in contact with the road, with the result that the wear is distributed evenly throughout the length of each of the chains. The circular shape and mounting of connecting links 16 also permits said connecting links to have an independent creeping or rotary movement with respect to both the side chains and the cross chains, with the result that the wear on the connecting links is also uniformly distributed.

It has been found that where circulating cross chains of the type herein disclosed are secured to the side chains by connecting links of oblong or other shapes, such connecting links tend to always keep the same relative position with respect to the cross chains, with the result that the wear incident to the circulation of the cross chains is imposed on the connecting links at substantially the same point, with the result that the connecting links are soon broken down. This objection is eliminated in the present construction due to the turning or creeping of the connecting links with respect to both the side chains and the cross chains.

Another advantage of the construction herein disclosed resides in the fact that in case of breakage the cross chains can be easily removed from the side chains without requiring the use of any tools for this purpose.

The device is simple in construction and easily attached to the wheel. The cross chains will wear out evenly and are much more satisfactory in wearing qualities than the usual type of cross chain which is anchored to the holding chains.

Having thus described my invention, what I claim is:

A device of the character described comprising side chains, endless cross chains extending between said side chains, relatively large circular connecting links rotatably secured to the side chains and loosely receiving the cross chains therethrough, said connecting links being arranged to cause at least one flight of the cross chains to extend in an oblique direction between the side chains, whereby the links of the cross chains are caused to creep through the connecting links during the use of the device and the said connecting links being also capable of a turning or creeping motion with respect to both the side chains and the cross chains.

In witness whereof, I have hereunto set my hand.

ALLEN N. SCOTT.